United States Patent [19]

Torenbeek et al.

[11] Patent Number: 4,950,422

[45] Date of Patent: Aug. 21, 1990

[54] PEROXIDE EMULSIONS CONTAINING AN ANTI-FREEZING COMPOUND

[75] Inventors: Reinder Torenbeek, Twello; Willem F. Verhelst, Gorssel, both of Netherlands

[73] Assignee: Akzona Incorporated, Chicago, Ill.

[21] Appl. No.: 578,594

[22] Filed: Feb. 10, 1984

Related U.S. Application Data

[60] Continuation of Ser. No. 534,264, Sep. 21, 1983, abandoned, which is a division of Ser. No. 417,759, Sep. 13, 1982, abandoned, which is a division of Ser. No. 222,844, Jan. 6, 1981, abandoned.

[51] Int. Cl.$^5$ ............................................. B01S 31/02
[52] U.S. Cl. ................................... 526/200; 562/599; 502/160; 526/202; 526/230.5; 526/232; 526/344.2
[58] Field of Search ....................... 252/426; 562/599

[56] References Cited

U.S. PATENT DOCUMENTS

| | | | |
|---|---|---|---|
| 2,648,656 | 8/1953 | Vandenberg | 260/82.5 |
| 2,665,269 | 1/1954 | Reynolds et al. | 260/84.7 |
| 2,837,502 | 3/1958 | Hanmer et al. | 526/212 |
| 2,932,628 | 4/1960 | Uraneck et al. | 260/84.1 |
| 3,029,229 | 4/1962 | Doell | 260/87.1 |
| 3,067,186 | 12/1962 | Bessant et al. | 260/92.8 |
| 3,182,026 | 5/1965 | Leveskis | 252/426 |
| 3,312,678 | 4/1967 | Crano | 260/93.5 |
| 3,324,097 | 6/1967 | Pears | 260/92.8 |
| 3,507,800 | 4/1970 | Loveskis | 252/186 |
| 3,631,009 | 7/1971 | Meyer | 526/212 |
| 3,825,509 | 4/1974 | Miller | 260/86.3 |
| 4,039,475 | 8/1977 | Oosterwijk et al. | 252/431 R |
| 4,043,940 | 8/1977 | Sanchez | 252/426 |
| 4,052,465 | 9/1977 | Roskott | 524/765 |
| 4,058,495 | 11/1977 | Serratore et al. | 260/17 A |
| 4,076,920 | 2/1978 | Mikofalvy et al. | 526/74 |
| 4,105,584 | 8/1978 | Norbäck et al. | 252/426 |
| 4,286,081 | 6/1981 | Mikofalvy | 526/212 |

FOREIGN PATENT DOCUMENTS

| | | |
|---|---|---|
| 2418386 | 4/1974 | Fed. Rep. of Germany . |
| 2634131 | 3/1977 | Fed. Rep. of Germany . |
| 2629467 | 5/1978 | Fed. Rep. of Germany . |
| 1095914 | 12/1967 | United Kingdom . |
| 1180363 | 2/1970 | United Kingdom . |

OTHER PUBLICATIONS

Minato et al., "Journal of Polymer Science", Part C, No. 23, pp. 761-764 (1968).
"Journal of Organic Chemistry of the USSR", vol. 13, No. 9, Part 1, pp. 1741-1744.
"Journal of General Chemistry of the USSR", vol. 30, No. 7 (1960), pp. 2368-2373.
Chemical Abstracts, "Synthetic High Polymers", vol. 76, 60180n, p. 9, 1972.
Chemical Abstracts, vol. 88, 21811x (1978).
36–Plastics Manuf., vol. 83 (1975), 148337z.

*Primary Examiner*—Jacqueline V. Howard
*Attorney, Agent, or Firm*—Oliff & Berridge

[57] ABSTRACT

This disclosure relates to aqueous peroxide emulsions and the use thereof in suspension (co)polymerization reactions. In particular, the aqueous peroxide emulsions comprise: (a) 20–60% by weight of an organic peroxide which is liquid at −5° C.; (b) 2–20% by weight of an aliphatic monohydric alcohol having 1–14 carbon atoms and/or aliphatic glycol having 2–4 carbon atoms; (c) a surfactant and/or a protective colloid; and (d) water. The emulsions of the present disclosure may be transported while in a liquid state at a temperature of −10° C. to −25° C. with minimal decrease in active oxygen content.

17 Claims, No Drawings

PEROXIDE EMULSIONS CONTAINING AN ANTI-FREEZING COMPOUND

This is a continuation of application Ser. No. 534,264, filed Sept. 21, 1983 (now abandoned, which was in turn a division of application Ser. No. 417,759, filed Sept. 13, 1982 (now abandoned), which was in turn a division of application Ser. No. 222,844, filed Jan. 6, 1981 (now abandoned).

The present invention relates to aqueous peroxide emulsions and the use thereof in suspension (co)polymerization reactions.

BACKGROUND OF THE INVENTION

U.S. Pat. No. 3,825,509 describes an aqueous emulsion obtained by emulsifying an organic peroxide in an aqueous solution containing 1–5% by weight of polyvinyl alcohol and 1–6% by weight of polyoxyethylene sorbitan monolaurate. However, such emulsions lack physical stability and at organic peroxide concentrations higher than 19% by weight these emulsions become viscous and difficult to handle. U.S. Pat. No. 3,988,261 describes aqueous peroxide emulsions consisting of 30–75% by weight of an organic peroxide; an emulsifying amount of a water-soluble surfactant; and water. These emulsions are stable to freeze-thaw cycles and therefore the emulsions are generally frozen for transportation and subsequently thawed before use. It is stated that as a result these frozen peroxide emulsions are relatively safe and easy to handle and transport. It is mentioned that the safe handling of such emulsions is due in part to the fact that frozen emulsions offer a large self-contained heat sink because of a latent heat of fusion of the water component.

However, the use of such frozen emulsions has several disadvantages. Due to the fact that in actual practice large quantities of frozen emulsions are generally stored, if the frozen emulsion is exposed to a rapidly rising ambient temperature, the relatively large heat sink and the low heat conductivity of ice will initially give rise only to the melting of the outermost portion of the frozen emulsion. Because of the difference between the conductivity of the liquid emulsion and the frozen emulsion, the temperature of the small amount of liquid peroxide emulsion produced will rapidly rise. Under such circumstances the frozen emulsion will produce the uncontrolled decomposition of the peroxide rather than non-frozen, aqueous emulsions. In addition the frozen emulsion particles tend to aggregate, and as a result the size of the resulting particles will be considerably increased.

Furthermore, procedures, employing frozen emulsions require several additional steps which are undesirable in practical applications. Initially, the emulsion must be frozen. Then before it can be used, the emulsion is thawed. Such thawing procedures require the utmost care. In addition, in view of the general instability of peroxides, the thawed emulsions must be rapidly processed. If this is not possible, the activity of the thawed peroxide emulsion will decrease radially. Although frozen emulsions may be employed in this solid form, metering of solid substances is difficult to automate and the fusion of the emulsion particles may make it difficult to obtain the correct feed rate.

Conventional emulsions contain, in addition to peroxide, generally surfactants, protective colloids and water. The incorporation in these emulsions of additional substances such as alkanols and alkane diols is considered objectionable in view of the possible negative influence thereof on the peroxide and the resulting polymer. For example, it has been noted that the addition of 0.5% to 2% by weight of 2-ethylhexanol to di-2-ethylhexylperoxydicarbonate causes the active oxygen content to decrease by 30 to 40% after two months storage at 0° C. For samples not containing the alcohol, the decrease in active oxygen content was 5%. Furthermore, alcohols may serve as chain transfer agents when utilized in (co)polymerization reactions of ethylenically unsaturated compounds and as a result cause a decrease in the molecular weight of the polymer.

German Patent Application No. 2,418,386 describes aqueous suspensions that contain 1–30% by weight of benzoyl peroxide, 1–30% by weight of surfactant and 10–80% by weight of an alcohol. However in a suspension, unlike an emulsion, the risk of alcohol diffusing in the peroxide is generally not expected. In addition, benzoyl peroxide is a member of a considerably stabler class of compounds than the present peroxides. German Patent Application No. 2,629,467 describes aqueous dispersions of solid oil-soluble radical initiators that are stable when stored at a temperature above −5° C. and may contain substances that decrease the melting point. The present invention, however, relates to emulsions of organic peroxides that are generally unstable at temperatures greater than −5° C.

SUMMARY OF THE INVENTION

The aqueous peroxide emulsions of the present invention comprise: (a) 20–60% by weight of an organic peroxide which is liquid at −5° C.; (b) 2–20% by weight of an alkanol having 1–4 carbon atoms and/or alkane diol having 2–4 carbon atoms; (c) a surfactant and/or protective colloid; and (d) water.

The emulsions of the present invention may be utilized in the suspension (co)polymerization of ethylenically unsaturated compounds such as, for example, vinyl chloride.

DESCRIPTION OF THE INVENTION

The aqueous peroxide emulsions according to the present invention employ 20–60% by weight and preferably 30–50% by weight of an organic peroxide which is liquid at −5° C. Organic peroxides employed in the emulsions of the present invention include peroxides of the formula:

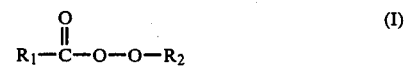

wherein, $R_1$ is a tertiary alkyl group having 4–9 carbon atoms or a phenoxymethyl group; and $R_2$ is an alkyl group having 4–8 carbon atoms or a cumyl group; and peroxydicarbonates of the formula:

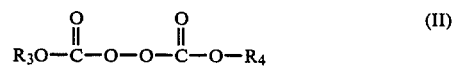

wherein, $R_3$ and $R_4$ are independently alkyl or alkoxyalkyl having 3–8 carbon atoms.

The alkyl groups represented by $R_1$, $R_2$, $R_3$ or $R_4$ may be branched or straight chain.

Examples of suitable peresters include, tertiarybutylperoxypivalate, tertiaryamylperoxypivalate, tertiarybutylperoxyneodecanoate, cumylperoxyneodecanoate, and 2,4,4-trimethylpentyl-peroxyphenoxyacetate. It is preferred to employ a peroxydicarbonate of formula (II) as the organic peroxide in the emulsion of the present invention. Examples of peroxydicarbonates for formula (II) include: di-n-propylperoxydicarbonate, di-n-butyl peroxydicarbonate, di-sec-butylperoxydicarbonate, di-2-ethylhexylperoxydicarbonate, di-3-methoxybutylperoxydicarbonate and di-2-ethoxyethylperoxydicarbonate.

In addition to an organic peroxide, the aqueous emulsions of the present invention employ 2–20% by weight and preferably 5–15% by weight of an alkanol having 1–4 carbon atoms and/or an alkane diol having 2–4 carbon atoms. The presence of such alcohols in the emulsions of the present invention produces a substantial decrease in the melting point of the emulsions. The emulsions of the present invention are liquids within a temperature range of $-10°$ C. to $-25°$ C. At very low temperatures, some of the peroxides employed in the present invention may become solid. However, this does not have any adverse effect on the stability of the resulting compositions and for convenience, such compositions are referred to as emulsions. If less than 2% by weight of an alcohol is added, a decrease in the freezing point of the resulting emulsion is noted but the decrease is too small for practical purposes. Adding more than 20% by weight of an alcohol may result in emulsions which may become inflammable. Representative of alcohols employed in the emulsions of the present invention include, for example, methanol, ethanol, isopropanol, n-butanol, ethylene glycol, propylene glycol and butylene glycol. It is preferred that the emulsion employ methanol.

The emulsions of the present invention generally employ 0.01–10% by weight of preferably 0.05–5% by weight of a surfactant and/or protective colloid. Suitable surfactants and/or protective colloids are described in U.S. Pat. No. 3,988,261. Examples of surfacants and/or protective colloids include, anionic surfactants such as carboxylates, sulphonates, sulphates, sulphated products and phosphate esters; nonionic surfactants such as ethoxylated alkylphenols, ethoxylated aliphatic alcohols, carboxylic esters, carboxylic amides, polyoxylakylene oxide block copolymers and polyvinyl alcohol, cationic surfactants and water-soluble cellulose ethers.

The aqueous peroxide emulsions of the present invention are prepared in accordance with known techniques and employing equipment commonly utilized for such purposes (for example U.S. Pat. No. 3,988,261).

The order in which the components of the emulsions of the present invention are added is not critical. Generally, the surfactants and/or the protective colloid are dissolved in water, followed by the successive addition of the alcohol and then organic peroxide. The organic peroxide, because of its instability, is usually added at a temperature below 5° C. The emulsion is agitated employing conventional emulsification equipment. It is preferred that the peroxide be emulsified in the aqueous medium. However, if desired the peroxide may be dissolved in an organic solvent such as an aliphatic hydrocarbon, which may be dispersed into the aqueous medium.

The particle size of the resulting emulsions is generally below 10 $\mu$m and preferably 1 $\mu$m.

The aqueous peroxide emulsions of the present invention may be employed in the suspension (co)polymerization ethylenically unsaturated compounds. Illustrative of ethylenically unsaturated compounds include, for example, butadiene, isoprene, 1,4-pentadiene, 1,6-hexadiene, 1,7-octadiene; polymerizable ethylenically unsaturated monomers, such as styrene or substituted styrenes, such as methyl styrene, 2,4-dimethyl styrene, ethyl styrene, isopropyl styrene, butyl styrene, phenyl styrene, cyclohexyl styrene, benzyl styrene, styrenes substituted with one or more halogen atoms, such as chlorostyrene, 2,5-dichlorostyrene, bromostyrene, fluorostyrene trifluromethyl styrene, iodostyrene; styrenes substituted with one or more functional groups, such a cyanostyrene, nitrostyrene, acetostyrene, phenoxystyrene; acryl monomers and substituted acryl monomers, such as acrylic acid, methacylic acid and the esters thereof having 1–18 carbon atoms, cyclohexyl(meth)acrylate, benzyl (meth)acrylate, isopropyl(meth)acrylate, butyl acrylate, 2-ethylehexylacrylate, phenyl(meth)acrylate; acrylonitrile, methacrylonitrile; vinyl esters and substituted vinyl esters derived from carboxylic acids containing 1–18 carbon atoms, such as vinyl formate, vinyl acetate, chlorovinyl acetate, vinyl butyrate, vinyl methoxyacetate, vinyl benzoate, methyl-4-vinyl benzoate, isopropenyl acetate; vinyl esters derived from unsaturated carboxylic esters containing 1–8 carbon atoms, such as vinyl acrylate, vinyl methacrylate; vinyl halides, such as vinyl fluoride, vinylidene fluoride, vinylidene chloride, vinyl bromide, vinylidene bromide, vinyl iodide; vinyl compounds having functional groups, such as p-vinylidene sulphide, p-vinylphenyl oxide, vinyl pyridine ether, vinylbutyl ether, vinyl-2-ethylhexyl ether, vinylphenyl ether, vinyl ketones, such as vinylethyl ketone, vinylphenyl ketone; allyl esters derived from carboxylic acids containing 1–18 carbon atoms; and vinyl chloride. It is preferred that the present aqueous emulsion be employed in the suspension polymerization of vinyl chloride. Such suspension (co)polymerizations are generally carried out employing techniques known to one of ordinary skill in art.

The following examples serve to illustrate the present invention.

EXAMPLE 1

In 478 g of water at 40° C. were dissolved 20 g of ethoxylated nonylphenol and 2 g of xanthan gum. To the resulting solution was added 100 g of methanol. The mixture solution was cooled to 2° C., then 400 g of di-2-ethylhexyl peroxydicarbonate was added.

The composition produced is a liquid emulsion capable of being transported at a temperature of $-10°$ C. In addition, the peroxide is stable at this temperature; i.e., after 6 months storage, the active oxygen content decreased by only 2%.

EXAMPLE 2

The procedure described in Example 1 was employed utilizing 400 g of di-sec. butyl peroxydicarbonate in lieu of di-ethylhexyl peroxydicarbonate. The composition produced is a liquid emulsion capable of being transported at a temperature of $-10°$ C. The peroxide was stable at this temperature, i.e., after 6 months the active oxygen content had decreased by only 2%.

EXAMPLE 3

In 448 g of water of 40° C. were dissolved 20 g of ethoxylated nonyl phenol and 2 g of xanthan gum. To the resulting solution was added 130 g of ethanol. The resultant mixture was cooled to 2° C., then 400 g of di-2-ethylhexyl peroxydicarbonate was added with stirring. The composition produced could be transported as a liquid emulsion at a temperature of −10° C. After 8 weeks storage of the emulsion at this temperature the active oxygen content had decreased by only 1.0%. For di-2-ethylhexyl peroxydicarbonate without any additives, this loss was 0.5%, this compound being stored over the same period and at the same temperature as the composition prepared in Example 3.

EXAMPLE 4

The procedure described in Example 3, was employed utilizing 400 g of tertiary butyl peroxyneodecanoate in lieu of di-2-ethylhexyl peroxydicarbonate. The resultant composition could be transported as a liquid emulsion at a temperature of −10° C. The peroxide displayed the same stability as the peroxide in Example 3.

EXAMPLE 5

The procedure described in Example 3, was employed utilizing 388 g of water and 190 g of ethylene glycol in lieu of 448 g of water and 130 g of ethanol. The resultant composition could be transported as a liquid emulsion at a temperature of −10° C. The stability of the peroxide was the same as obtained for the peroxide in Example 3.

EXAMPLE 6

In 460 g of water of 40° C. were dissolved 20 g of ethoxylated fatty acid alcohol and 20 g of polyvinyl alcohol. To the resulting solution was added 100 g of methanol. The resultant mixture was cooled to 2° C., then 400 g of di-ethylhexyl peroxydicarbonate was added with stirring. The composition produced could be transported as a liquid emulsion at a temperature of −10° C. After 8 weeks storage at this temperature the active oxygen content had decreased by only 1%.

Similar results were obtained when a stabilizer system made up of 20 g of ethoxylated sorbitan ester and 20 g of hydroxypropyl methyl cellulose was utilized.

EXAMPLE 7

The emulsion prepared in with Example 1 was employed in the polymerization of vinyl chloride. 0.26 g of the emulsion prepared in Example 1 was added to a mixture containing 340 g of water, 200 g of vinyl chloride and 0.2 g of polyvinyl alcohol. The polymerization reaction was carried out in a 1-liter, stirred polymerization autoclave at a temperature of 55° C.

For comparison, this experiment was repeated employing a peroxide emulsion containing water in lieu of methanol. Table I summarizes the results.

TABLE 1

| | Use of the emulsion | |
| --- | --- | --- |
| | without methanol | with methanol |
| conversion (%) | 88 | 88 |
| apparent density (g/cm$^3$) | 0.39 | 0.40 |
| plasticizer absorption (%) | 19 | 18 |
| mean particle size ($\mu$m) | 152 | 153 |
| dry flow (g/sec) | 3.2 | 3.3 |
| K-value* | 68 | 68 |

*K-value is a parameter for the mol. weight of the polymer.

The results illustrate that the presence of the methanol produces no unfavourable properties with respect to the polyvinyl chloride obtained.

What is claimed is:

1. An aqueous peroxide emulsion consisting essentially of:
   (a) 20–60% by weight of an organic peroxide which is liquid at −5° C. and generally thermally unstable at temperature of about −5° C.;
   (b) an amount of at least 2% by weight of one or more alkanols containing 1–4 carbon atoms or alkane diols containing 2–4 carbon atoms which produces such a decrease in a melting point of said emulsion that said emulsion is liquid within a temperature range of −10° C. to −25° C.;
   (c) a surfactant and/or protective colloid;
   (d) water.

2. An aqueous peroxide emulsion according to claim 1, wherein said one or more alkanols or alkane diols are present in an amount of 2≧20% by weight.

3. An aqueous peroxide emulsion consisting essentially of:
   (a) 20–60% by weight of an organic peroxide which is liquid at −5° C. and generally thermally unstable at temperatures of about −5° C.;
   (b) an amount of at least 2% by weight of one or more alkanols containing 1–4 carbon atoms or alkane diols containing 2–4 carbon atoms which produces such a decrease in a melting point of said emulsion that said emulsion is liquid within a temperature range of −10° C. to −25° C.;
   (c) a surfactant and/or protective colloid;
   (d) water;
   wherein the organic peroxide is selected from the class of peroxides of the formula

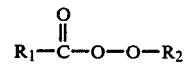

and peroxydicarbonate of the formula

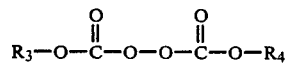

wherein R$_1$ is a tertiary alkyl group having 4–9 carbon atoms or a phenoxymethyl group; and R$_2$ is an alkyl group having 4–8 carbon atoms or a cumyl group; R$_3$ and R$_4$ are independently alkyl having 3–8 carbon atoms or substituted alkyl substituted with one or more alkoxy groups having 1–3 carbon atoms.

4. An aqueous peroxide emulsion according to claim 3, wherein said one or more alkanols or alkane diols are present in an amount of 2–20% by weight.

5. An aqueous peroxide emulsion according to claim 3, wherein the organic peroxide is a peroxydicarbonate of the formula:

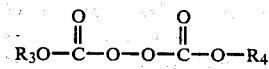

wherein R$_3$ and R$_4$ are independently alkyl containing 3 to 8 carbon atoms or substituted alkyl substituted with one or more alkoxy groups having 1–3 carbon atoms.

6. An aqueous peroxide emulsion according to claim 5, wherein the alkanol is methanol.

7. An aqueous peroxide emulsion according to claim 1, comprising 0.1-10% by weight of said surfactant and/or protective colloid.

8. A process for the suspension (co)polymerization of an ethylenically unsaturated compound in the presence of an organic peroxide, employing an aqueous emulsion according to claim 1.

9. A process according to claim 8 employing an aqueous emulsion according to claim 3.

10. A process according to claim 7 employing an aqueous emulsion according to claim 5.

11. A process according to claim 7 employing an aqueous emulsion according to claim 6.

12. A process according to claim 8 wherein the ethylenically unsaturated compound is vinyl chloride.

13. A process according to claim 9 wherein the ethylenically unsaturated compound is vinyl chloride.

14. A process according to claim 10 wherein the ethylenically unsaturated compound is vinyl chloride.

15. A process according to claim 11 wherein the ethlenically unsaturated compound is vinyl chloride.

16. An aqueous peroxide emulsion for use in the suspension co-polymerization of ethylenically unsaturated compounds, consisting essentially of:
(a) 20-60% by weight of an organic peroxide which is liquid at $-5°$ C.;
(b) an amount of at least 2% by weight of onr or more alkanols containing 1-4 carbon atoms or alkane diols containing 2-4 carbon atoms which produces such a decrease in a melting point of said emulsion that said emulsion is liquid within a temperature range of $-10°$ C. to $-25°$ C.;
(c) a surfactant and/or protective colloid;
(d) water,
wherein the organic peroxide is selected from the class of peroxides of the formula

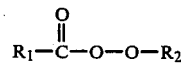

and peroxydicarbonate of the formula

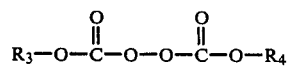

wherein $R_1$ is a tertiary alkyl group having 4-9 carbon atoms or a phenoxymethyl group; $R_2$ is an alkyl group having 4-8 carbon atoms or a cumyl group; and $R_3$ and $R_4$ are independently alkyl having 3-8 carbon atoms or substituted alkyl substituted with one or more alkoxy groups having 1-3 carbon atoms, said emulsion being in a liquid state at $-10°$ C.

17. An aqueous peroxide emulsion according to claim 16, wherein said one or more alkanols or alkane diols are present in an amount of 2-20% by weight.

* * * * *

UNITED STATES PATENT AND TRADEMARK OFFICE
CERTIFICATE OF CORRECTION

PATENT NO. : 4,950,422
DATED : August 21, 1990
INVENTOR(S) : Reinder TORENBEEK et al.

It is certified that error appears in the above-identified patent and that said Letters Patent is hereby corrected as shown below:

Item [57],
On the cover page, in the ABSTRACT, line 6, change "1-14" to --1-4--.

Column 1, line 6, change "abandoned," to --abandoned),--.

Column 2, line 63, delete "or alkoxyal-";

line 64, delete "kyl"; after "atoms" insert --or substituted alkyl substituted with one or more alkoxy groups having 1-3 carbon atoms--.

Column 3, line 54, change "surfactants" to --surfactant--.

Column 6, in claim 2, line 18, change "2≧20%" t --2-20%--.

Column 7, in claim 16, line 27, change "onr" to --one--.

Signed and Sealed this

Twenty-eighth Day of June, 1994

BRUCE LEHMAN

*Attest:*

*Attesting Officer*       Commissioner of Patents and Trademarks